US009559450B2

(12) United States Patent
Tsuji et al.

(10) Patent No.: US 9,559,450 B2
(45) Date of Patent: Jan. 31, 2017

(54) CARD CONNECTOR AND CONTACT WITH BUCKLING PREVENTION

(71) Applicant: Tyco Electronics Japan G.K., Kanagawa (JP)

(72) Inventors: Junya Tsuji, Kanagawa-ken (JP); Tetsuya Katano, Kanagawa (JP)

(73) Assignee: Tyco Electronics Japan G.K., Kanagawa-ken (JP)

( * ) Notice: Subject to any disclaimer, the term of this patent is extended or adjusted under 35 U.S.C. 154(b) by 0 days.

(21) Appl. No.: 14/317,800

(22) Filed: Jun. 27, 2014

(65) Prior Publication Data

US 2015/0004850 A1    Jan. 1, 2015

(30) Foreign Application Priority Data

Jun. 28, 2013 (JP) .................................. 2013-135835

(51) Int. Cl.
*H01R 24/00* (2011.01)
*H01R 13/24* (2006.01)
*G06K 7/00* (2006.01)
*G06K 13/08* (2006.01)

(52) U.S. Cl.
CPC ........... *H01R 13/245* (2013.01); *G06K 7/0013* (2013.01); *G06K 13/0825* (2013.01)

(58) Field of Classification Search
CPC ............ G06K 13/0825; G06K 13/0806; G06K 13/0837; G06K 7/0013; G06K 7/0021; H01R 13/245; H01R 13/2407; H01R 13/2457
USPC ......................... 439/630, 862, 637, 660, 330
See application file for complete search history.

(56) References Cited

U.S. PATENT DOCUMENTS

| 6,616,485 | B2 * | 9/2003 | Harasawa | H01R 13/2442 |
| | | | | 439/630 |
| 6,881,086 | B2 | 4/2005 | Ohashi | |
| 6,984,130 | B2 * | 1/2006 | Richter et al. | 439/66 |
| 7,037,125 | B1 * | 5/2006 | Kuan | G06K 13/0806 |
| | | | | 439/159 |
| 7,195,501 | B2 | 3/2007 | Zhao | |
| 7,220,152 | B2 * | 5/2007 | Jeong | H01R 13/2492 |
| | | | | 439/862 |
| 7,261,578 | B2 | 8/2007 | Zhao | |
| 7,670,161 | B2 * | 3/2010 | Hsiao | G06K 19/07732 |
| | | | | 235/441 |

(Continued)

FOREIGN PATENT DOCUMENTS

| CN | 2548304 Y | 4/2003 |
| CN | 102544815 A | 7/2012 |

(Continued)

OTHER PUBLICATIONS

Abstract of CN103367949, published Oct. 23, 2013, 1 page.

(Continued)

*Primary Examiner* — Tulsidas C Patel
*Assistant Examiner* — Peter G Leigh
(74) *Attorney, Agent, or Firm* — Barley Snyder

(57) ABSTRACT

A card connector is provided having a housing and a contact. The housing includes a card receiving space. The contact is supported by the housing and includes a contact arm and an extended portion. The contact arm includes a free end and the extended portion includes a first end positioned below the contact arm on which the free end of the contact arm slides.

19 Claims, 7 Drawing Sheets

(56) References Cited

U.S. PATENT DOCUMENTS

| | | | |
|---|---|---|---|
| 8,517,779 B2* | 8/2013 | Zhang | H01R 4/64 439/862 |
| 2003/0139077 A1* | 7/2003 | Sasaki et al. | 439/159 |
| 2004/0014342 A1* | 1/2004 | Yu et al. | 439/159 |
| 2005/0095917 A1* | 5/2005 | Miyamoto | 439/630 |
| 2006/0068627 A1* | 3/2006 | Matsunaga | 439/331 |
| 2006/0089052 A1* | 4/2006 | Lu et al. | 439/630 |
| 2007/0037424 A1* | 2/2007 | Matsukawa et al. | 439/159 |
| 2007/0155210 A1* | 7/2007 | Matsukama et al. | 439/159 |
| 2007/0243735 A1* | 10/2007 | Juang | 439/159 |
| 2008/0160808 A1* | 7/2008 | Hsiao | 439/160 |
| 2008/0299806 A1* | 12/2008 | Hsiao | 439/159 |
| 2009/0023318 A1* | 1/2009 | Nishioka et al. | 439/159 |
| 2009/0061670 A1* | 3/2009 | Chen | G06K 7/0021 439/188 |
| 2009/0286428 A1* | 11/2009 | Wu | G06K 7/0021 439/752.5 |
| 2010/0015824 A1* | 1/2010 | Wang et al. | 439/108 |
| 2010/0210128 A1* | 8/2010 | Matsunaga | 439/159 |
| 2011/0008985 A1* | 1/2011 | Matsumoto et al. | 439/329 |
| 2011/0104920 A1* | 5/2011 | Matsunaga | 439/152 |
| 2011/0306224 A1* | 12/2011 | Guo et al. | 439/159 |
| 2012/0315781 A1* | 12/2012 | Little et al. | 439/345 |
| 2013/0012070 A1* | 1/2013 | Uesaka et al. | 439/629 |
| 2013/0050964 A1* | 2/2013 | Kume | 361/754 |
| 2013/0102171 A1* | 4/2013 | Zhu et al. | 439/157 |

FOREIGN PATENT DOCUMENTS

| | | | |
|---|---|---|---|
| CN | 103367949 A | | 10/2013 |
| JP | 8250179 A | | 9/1996 |
| JP | 8-330009 | | 12/1996 |
| JP | 2002-110295 A | | 4/2002 |
| JP | 200897947 A | | 4/2008 |
| JP | 2012-129028 A | | 7/2012 |
| JP | 2013-206663 A | | 10/2013 |
| KR | 101476301 B1 | * | 12/2014 |
| WO | 02056419 A2 | | 7/2002 |

OTHER PUBLICATIONS

Abstract of CN2548304, published Apr. 30, 2003, 1 page.
Chinese Evaluation Report of Utility Model Patent, dated Nov. 28, 2014, 10 pages.
Korean Office Action, dated Feb. 27, 2015, 4 pages.
Abstract of JP2008097947A, 1 page.
Abstract of JPH08250179A, 1 page.
Chinese Office Action, dated Feb. 3, 2016, 3 pages.
Korean Intellectual Property Office, Notice of Final Rejection, dated Aug. 17, 2015, 4 pages.
English Translation of Korean Intellectual Property Office, Notice of Final Rejection, dated Aug. 17, 2015, 3 pages.
Abstract of KR101476301(B1), dated Dec. 24, 2014, 1 page.

* cited by examiner (A)

CARD CONNECTOR AND CONTACT WITH BUCKLING PREVENTION

CROSS-REFERENCE TO RELATED APPLICATIONS

This application claims the benefit of the filing date under 35 U.S.C. §119(a)-(d) of Japanese Patent Application No. 2013-135835 of Jun. 28, 2013.

FIELD OF THE INVENTION

The invention relates to a connector and, more particularly, to a card connector.

BACKGROUND

Cards, such as memory cards, are becoming smaller and smaller, all the while requiring additional functions, for example, transitioning a micro SIM (Subscriber Identity Module) card to a nano SIM card, which is smaller than the micro SIM card. There is a demand for use of the nano SIM card in a device equipped with a card connector for the micro SIM card. Generally, a mobile-phone company provides no warranty for usage of a nano SIM card in a micro SIM card connector, and users generally perform this under personal responsibility using an adapter. That is, the nano SIM card is attached to the adapter, and the nano SIM card which has been attached to the adapter is inserted together with the adapter into the card connector adapted to the micro SIM card. In this manner, the nano SIM card can be used in the card connector adapted to the micro SIM card.

In this regard, JP 2012-129028 A discloses a known card connector provided with a cantilever-type contact having a free end.

There is no standard for the size or the like of an adapter used for such a purpose. Therefore, a step may occur between an adapter and the nano SIM card attached thereto. In this case, when the nano SIM card with the adapter is pulled out of the card connector, the free end of the contact may get caught in the step, which may cause the contact to buckle or to be damaged, thereby causing the card connector to break down. To this effect, a contact with fixed ends fixed may be provided. Thus, the contact has both ends fixed, and buckling or damage of the contact is prevented. However, if the contact having ends is adopted, contact pressure with the card may become excessively high, which may damage the card or shorten the life of the card.

JP H08-330009 A discloses a known contact having a cantilever-type tongue piece with a box type contact portion and an inverted-V shape slide on a bottom plate of the box type contact portion. Since the contact tongue piece has an inverted-V shape, buckling or the like of the contact tongue piece can be avoided. However, for a card connector, numerous contacts are formed from sheet metal, and since the contact is a relatively long part, forming the contact by folding back sheet metal like the known contact tongue piece of JP H08-330009 requires sheet metal having a large area as sheet metal material for the contact, which causes an increase in material cost, which is undesirable.

SUMMARY

In view of these circumstances, an object of the invention, among others, is to provide a card connector preventing the buckling or damage described above, and a contact adopted in the card connector.

The card connector includes a housing and a contact. The housing includes a card receiving space. The contact is supported by the housing and includes a contact arm and an extended portion. The contact arm includes a free end and the extended portion includes a first end positioned below the contact arm on which the free end of the contact arm may slide.

BRIEF DESCRIPTION OF THE DRAWINGS

The invention will now be described by way of example with reference to the accompanying figures, of which.

DETAILED DESCRIPTION OF THE EMBODIMENT(S)

The invention will be described below by way of examples with reference to the accompanying drawings.

Figure 1:
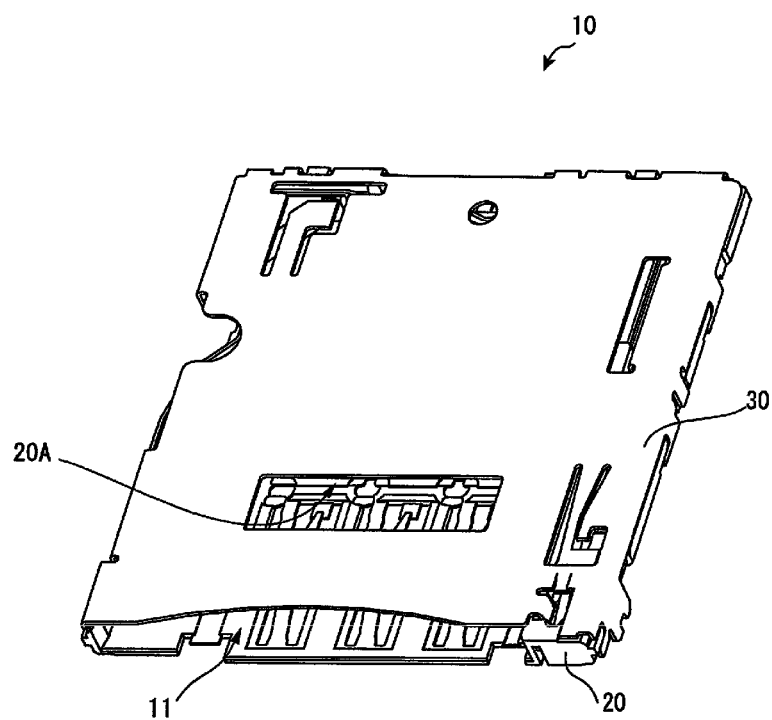
FIG. 1 is a perspective view of a card connector according to the invention.

With reference to FIGS. 1-4, a card connector 10 is shown which is to be mounted on a surface of a circuit board (not shown). The card connector 10 is also a card connector into which a micro SIM card, which is an example of cards referred to in the invention, is inserted. The card connector 10, as shown in FIG. 1, includes a housing 20 and a metallic shell 30. Between the housing 20 and the shell 30, a card insertion passageway 11 through which the micro SIM card (not shown) is inserted is provided. In addition, a receiving space 20A is formed in the housing 20, behind the card insertion passageway 11, to receive the micro SIM card when inserted there into.

Figure 2:
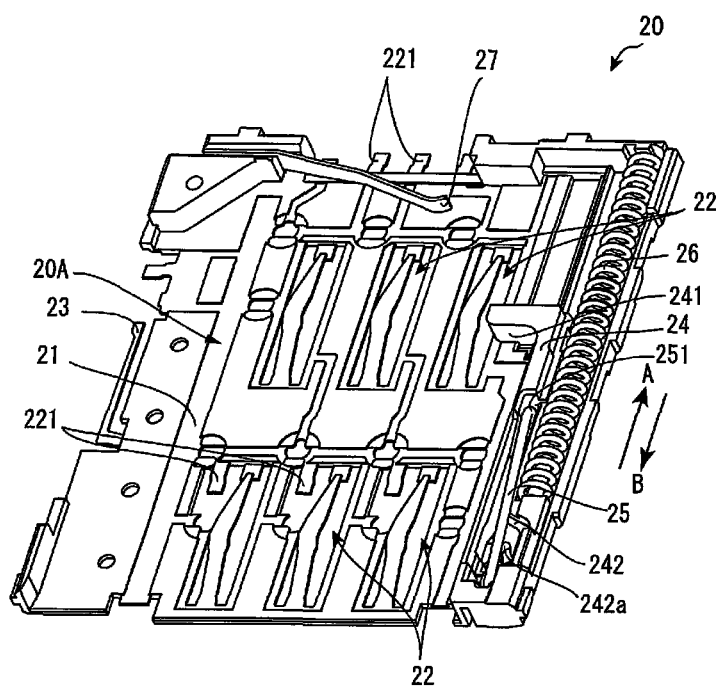
FIG. 2 is a perspective view showing a top side of a housing of the card connector according to the invention after a shell has been removed.

As shown in FIG. 2, the housing 20 has a body 21, a plurality of contacts 22 insert-molded to the body 21, and two switch contacts 23 and 27 constituting two respective switches.

Figure 4:
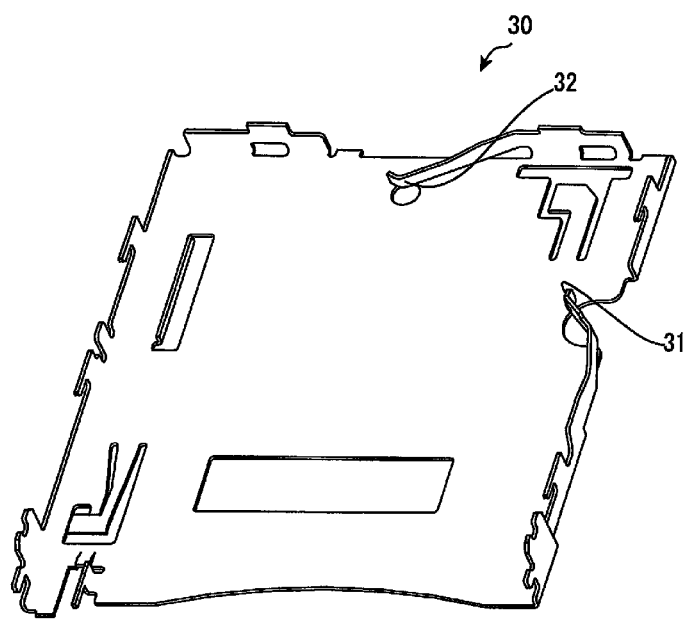
FIG. 4 is a perspective view of an inner face of a shell of the card connector according to the invention.

As shown in FIG. 4, two switch contacts 31 and 32 are also formed in the shell 30. First switch contact 31 of these two switch contacts 31 and 32 is paired with first switch contact 23 provided in the housing 20 to constitute a first switch. Likewise, the second switch contact 32 formed in the shell 30 is paired with the second switch contact 27 provided in the housing 20 to constitute a second switch.

Figure 3:
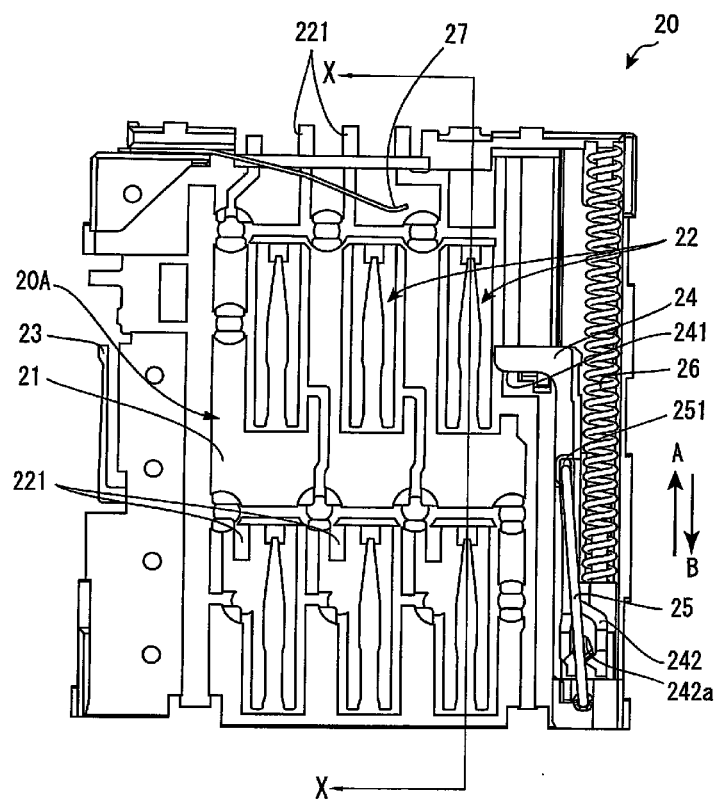
FIG. 3 is a top view of the housing of FIG. 2.

As shown in FIGS. 2 and 3, the contact 22 has a board connection portion 221 for being connected to the circuit board. These contacts 22 come into electrical contact with the inserted micro SIM card to relay power supply from the circuit board to the micro SIM card or access to the micro SIM card.

The first switch contact 23, as well as the plurality of contacts 22 relaying the circuit board and the micro SIM card to each other, is insert-molded to the body 21. In order to insert-mold the switch contact 23 or the plurality of contacts 22, a lead frame having a form in which the switch contact 23 and the plurality of contacts 22 are connected is produced by stamping and forming sheet metal. Then, the lead frame is insert-molded. Then, after the forming, appropriate portions of the lead frame are cut so that the switch contact 23 and the plurality of contacts 22 are each formed as independent circuits. The detail of these contacts 22 will be described later.

The second switch contact 27 of the two switch contacts 23 and 27 provided in the housing 20 is fixed to the housing by press fitting.

The housing 20 is further provided with a slider 24, a cam bar 25, and a coil spring 26. The slider 24 is a member sliding on the body 21 in an insertion direction (the direction of an arrow A) and an ejection direction (the direction of an arrow B). This slider 24 is biased in the ejection direction (the direction of the arrow B) by the coil spring 26. This slider 24 has a card receiving portion 241 pushed by the inserted micro SIM card, and a so-called heart cam groove 242. A cam pin 251, positioned at a distal end of the cam bar 25, enters the heart cam groove 242.

When the micro SIM card is inserted, the micro SIM card abuts on the card receiving portion 241. When the micro SIM card is further inserted, the slider 24 is pushed by the micro SIM card, and the slider 24 is slid in the insertion direction (the direction of the arrow A) against the biasing force of the coil spring 26. When the slider 24 is slid to the final position in the insertion direction, the cam pin 251 enters a locking position 242a of the heart cam groove 242 to be locked in a final position. When the micro SIM card is pushed again in the insertion direction with a finger, the cam pin 251 is unlocked from the locking position 242a of the heart cam groove 242. Thereafter, when the finger is taken away from the micro SIM card, the slider 24 is pushed by the soil spring 26 to be slid in the ejection direction (the direction of the arrow B). In this manner, the micro SIM card is pushed by the slider 24 and moved in the ejection direction (the direction of the arrow B) until a part of the micro SIM card projects from the card insertion passageway 11 (see FIG. 1). This micro SIM card is pinched and ejected by fingers or a tool, such as tweezers.

The switch contact 31 provided in the shell 30, which constitutes the first switch, is pushed by the micro SIM card when the micro SIM card is inserted to a predetermined position in the middle of insertion. Then, the switch contact 31 pushed by the micro SIM card comes into contact with the switch contact 23 provided in the housing 20. Thereby, the fact that the micro SIM card has been inserted to the predetermined position is detected. That is, this first switch is a switch detecting the fact that the micro SIM card has been inserted to the predetermined position in the middle of insertion.

As shown in FIG. 2 and FIG. 3, the plurality of contacts 22 are arranged in two rows on front and back sides in the insertion direction (the direction of the arrow A). Correspondingly, pads (not shown) coming into contact with each contact 22 are arranged in two rows on the micro SIM card. Therefore, when the micro SIM card is inserted in the insertion direction (the direction of the arrow A), the pads to be brought into contact with the contacts 22 on the back side are first brought into contact with the plurality of contacts 22 on the front side. At this time, if the power supply is inadvertently turned on, data in the micro SIM card may be damaged or the micro SIM card may be broken. The above first switch serves to detect the fact that the micro SIM card has been inserted to the middle position in the insertion direction to avoid such an accident.

The second switch contact 27 is pushed by the micro SIM card when the micro SIM card is inserted to the back side in the insertion direction, and is brought into contact with the switch contact 32 provided in the shell 30. Thereby, the fact that the operation for ejecting the micro SIM card has been started is detected. That is, the second switch 27 detects the fact that the micro SIM card has been inserted to the back side in the insertion direction, thereby signaling the card ejection to a device at the start of the operation for ejecting the micro SIM card so that the power supply is turned off promptly.

It should be noted that the description herein assumes that the micro SIM card is inserted into the card connector 10 described with reference to FIG. 1 to FIG. 4. However, a nano SIM card is attached to an adapter, and the nano SIM card which has been attached to the adapter is also inserted together with the adapter into the card connector 10.

Figure 5:
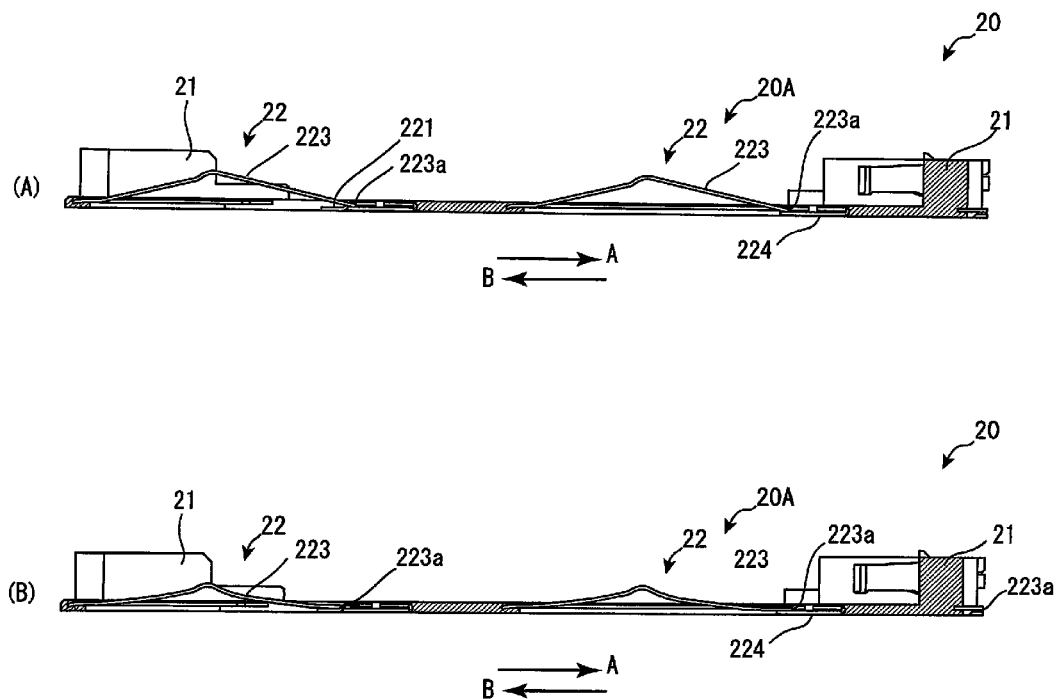
FIG. 5 is a sectional view of the card connector of FIG. 3, taken along an line X-X.
Figure 6:
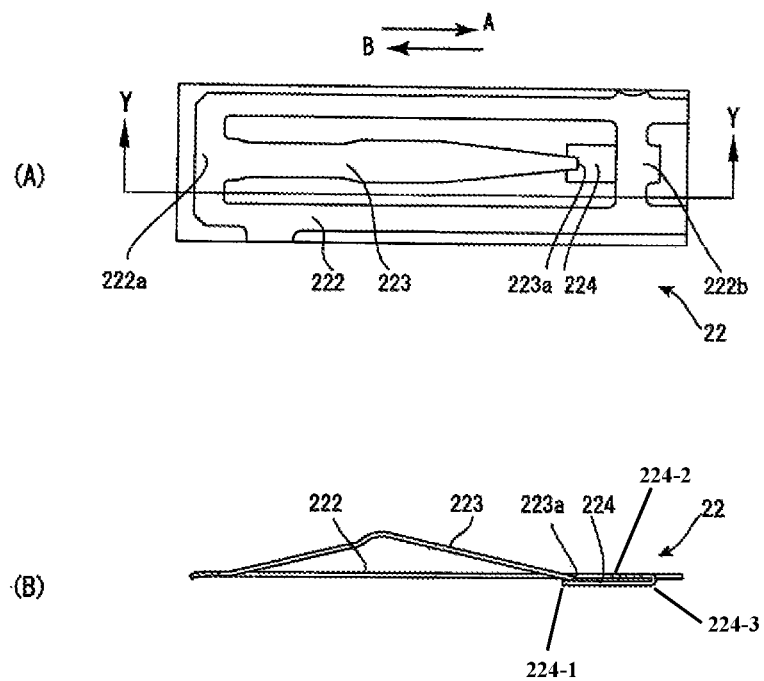
FIG. 6(A) is a close-up top view of a contact for the card connector of FIG. 3.
FIG. 6(B) is a side view of the contact of FIG. 6(A), taken along an line Y-Y.

Next, the structure of a contact for the card connector according to the invention will be described with reference to FIGS. 5-6(B).

The frame 222 is fixed to the body 21 (see FIG. 2 and FIG. 3) by the insert molding described above.

In addition, the contact arm 223 extends toward the back side in the insertion direction (the direction of the arrow A) from a first side 222a of the frame 222 on the front side in the insertion direction, and has a free end 223a on the back side in the insertion direction. As shown in FIGS. 5A and 5B, the contact arm 223 extends at an obtuse angle with respect to the first side 222a. Further, while extending toward the back side in the insertion direction (the direction of the arrow A), the contact arm 223 can enter the receiving space 20A (see FIG. 5) of the body 21 shown in FIG. 2 and FIG. 3 and to depart from the receiving space 20A. Specifically, in the shown embodiment, the contact arm 223 is formed in an inverted-V shape, as shown in FIGS. 5(A) and 6(B). When the micro SIM card is inserted into the receiving space 20A, the contact arm 223 is pushed by the micro SIM card inserted into the receiving space 20A, and is elastically deformed toward being pushed out of the receiving space 20A to take a shape shown in FIG. 5(B).

Further, the extended portion 224 of the contact 22 is formed as a rigid member with the frame 222, folded back from its second side 222b (see FIG. 6A) on the back side in the insertion direction (the direction of arrow A) at a deeper portion of the sheet metal before being stamped and formed than the second side 222b so as to extend toward the first side 222a. As shown in FIG. 6B, the extended portion 224 extends horizontally from the second side 222b, and has a first end 224-1, a second end 224-2 positioned above the first end 224-1, and a fixed end 224-3 extending away from the contact arm 223. The free end 223a of the contact arm 223 is put on the extended portion 224, the first end 224-1 positioned below the free end 223a. This free end 223a may be in contact with the extended portion 224 or may float slightly above the extended portion 224 when the micro SIM card is not inserted. When the micro SIM card is inserted into the receiving space 20A, the contact arm 223 is pushed by the micro SIM card toward being pushed out of the receiving space 20A, and elastically deformed into the shape shown in FIG. 5(B). At this time, the free end 223a of the contact arm 223 comes into contact with the extended portion 224 and slides on the extended portion 224 toward the back side in the insertion direction (the direction of the arrow A). This sliding keeps the posture of the contact arm 223. This sliding also keeps appropriate contact pressure of the contact arm 223 to the micro SIM card.

When the micro SIM card is ejected from the card connector 10, the contact arm 223 is restored from its deformation, and returns to the inverted-V shape shown in FIG. 5(A).

As mentioned before, not only the micro SIM card but also a nano SIM card with an adapter may be inserted into the card connector 10.

Figure 7:
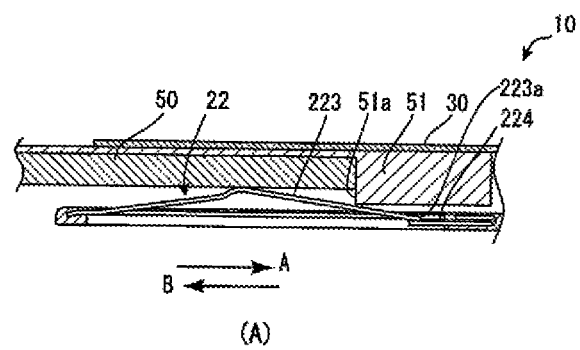
FIG. 7(A) is a sectional view of the card connector according to the invention after insertion of a nano SIM card attached to an adapter.
FIG. 7(B) is a sectional view of a conventional card connector after insertion of a nano SIM card attached to an adapter.
Figure 7:
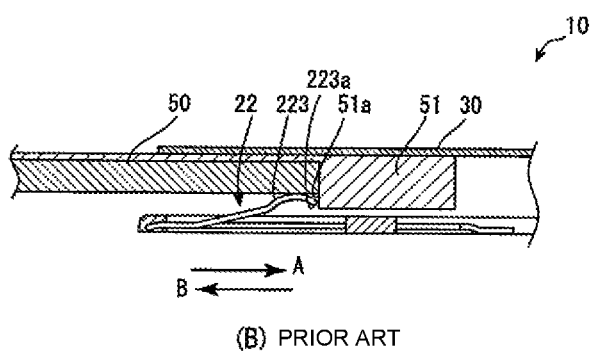

Now with to FIGS. 7(A) and 7(B), a nano SIM card 50 is attached to an adapter 51, and the nano SIM card is inserted into the card connector 10, remaining attached to the adapter 51. The positions of the pads of the nano SIM card 50 contacting the contact arms 223 are roughly in common with the micro SIM card, so that the contact arms 223 come into direct contact with the pads of the nano SIM card 50.

The size of the adapter 51 does not match the size of the nano SIM card, and a step 51a is formed in the adapter 51. Therefore, as shown in FIG. 7(B), in the case of a conventional contact arm 223, when the nano SIM card 50 with the adapter 51 is ejected from the card connector 10, a problem may arise. That is, when the nano SIM card 50 with the adapter 51 is ejected from the card connector 10, the free end 223a of the contact arm 223 is caught in the step 51a, which may cause the contact arm 223 to buckle or to be damaged.

In contrast, in the case of the contact arm 223 having a shape shown in FIG. 7(A), the nano SIM card 50 with the adapter 51 can be smoothly ejected even if the step 51a is present.

It should be noted that the invention has been described herein taking the card connector for a micro SIM card as an example, but the invention is not limited to the card connector for a micro SIM card, and is widely applicable to overall card connectors into which a card is inserted.

In addition, in the embodiment, the contact arm 223 of the contact 22 extends toward the back side in the insertion direction, but may extend toward the front side in the insertion direction. In that case, the extended portion 224 of the contact 22 extends from the second side on the front side in the insertion direction to the first side.

Further, the extended portion 224 is folded back and then extends under the second side toward the first side, but it may extend over the second side.

The foregoing illustrates some of the possibilities for practicing the invention. Many other embodiments and fields of use for are possible and within the scope and spirit of the invention. It is, therefore, intended that the foregoing description be regarded as illustrative rather than limiting, and that the scope of the invention is given by the appended claims together with their full range of equivalents.

What is claimed is:

1. A card connector comprising:
   a housing having a card receiving space; and
   a contact supported by the housing and having:
   a contact arm having a free end; and
   a rigid extended portion having a first end positioned below the contact arm on which the free end of the contact arm slides.

2. The card connector according to claim 1, wherein the extended portion includes a second end positioned above the first end and having a fixed end extending away from the contact arm.

3. The card connector according to claim 2, wherein the extended portion bends backward toward the contact arm.

4. The card connector according to claim 1, wherein the free end is elastic.

5. The card connector according to claim 1, wherein the contact arm includes a fixed end opposite the free end.

6. The card connector according to claim 5, wherein the contact arm includes a bend positioned between the fixed end and the free end.

7. The card connector according to claim 6, wherein the bend is positioned above the free end.

8. The card connector according to claim 7, wherein the bend is positioned above the fixed end.

9. The card connector according to claim 1, wherein the contact arm has an inverted-V shape.

10. A contact, comprising:
    a frame having a first side, a second side, and a contact arm receiving passageway positioned between the first side and the second side;
    a contact arm attached at an obtuse angle with respect to the first side and having a free end extending toward the second side of the frame; and
    an extended portion attached to the second side and having a first end positioned below the contact arm on which the free end of the contact arm slides.

11. The contact according to claim 10, wherein the extended portion includes a second end positioned above the first end and having a fixed end extending away from the contact arm.

12. The contact according to claim 11, wherein the extended portion bends backward toward the contact arm.

13. The contact according to claim 10, wherein the free end is elastic.

14. The contact according to claim 10, wherein the contact arm includes a fixed end opposite the free end.

15. The contact according to claim 14, wherein the contact arm includes a bend positioned between the fixed end and the free end.

16. The contact according to claim 15, wherein the bend is positioned above the free end.

17. The contact according to claim 16, wherein the bend is positioned above the fixed end.

18. The contact according to claim 10, wherein the contact arm has an inverted-V shape.

19. A contact, comprising:
    a frame having a first side, a second side, and a contact arm receiving passageway positioned between the first side and the second side;
    a contact arm attached at a fixed end to the first side and having an opposite free end extending toward the second side of the frame, the free end and the fixed end positioned at a same height with respect to the frame; and
    an extended portion attached to the second side and having a first end positioned below the contact arm on which the free end of the contact arm slides.

* * * * *